US 8,220,046 B2

(12) United States Patent
Hamilton et al.

(10) Patent No.: US 8,220,046 B2
(45) Date of Patent: Jul. 10, 2012

(54) METHOD AND SYSTEM FOR GNSS RECEIVER LOGIN PROTECTION AND PREVENTION

(75) Inventors: Jeffery A. Hamilton, Westminster, CO (US); Stuart Riley, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 1005 days.

(21) Appl. No.: 11/804,410

(22) Filed: May 18, 2007

(65) Prior Publication Data

US 2008/0289033 A1 Nov. 20, 2008

(51) Int. Cl.
G06F 21/00 (2006.01)

(52) U.S. Cl. ........... 726/19; 726/17; 726/18; 726/16; 726/21; 726/2; 726/4; 726/7; 701/200; 701/208; 701/213; 701/215; 455/456.1; 455/456.2; 455/456.3; 455/456.6; 709/27; 709/228; 713/182

(58) Field of Classification Search .................. None
See application file for complete search history.

(56) References Cited

U.S. PATENT DOCUMENTS

| | | | | |
|---|---|---|---|---|
| 4,860,352 A * | 8/1989 | Laurance et al. | | 380/258 |
| 5,640,452 A | 6/1997 | Murphy | | |
| 5,887,269 A * | 3/1999 | Brunts et al. | | 701/486 |
| 6,317,500 B1 | 11/2001 | Murphy | | |
| 6,370,629 B1 * | 4/2002 | Hastings et al. | | 711/163 |
| 6,768,942 B1 * | 7/2004 | Chojnacki | | 701/532 |
| 6,948,066 B2 * | 9/2005 | Hind et al. | | 713/168 |
| 7,194,620 B1 * | 3/2007 | Hayes | | 713/157 |
| 7,512,989 B2 | 3/2009 | Scott | | |
| 7,706,837 B2 | 4/2010 | Ladouceur | | |
| 7,898,409 B2 * | 3/2011 | Loomis et al. | | 340/539.13 |
| 7,933,611 B2 * | 4/2011 | Bocking et al. | | 455/456.4 |
| 8,032,152 B2 * | 10/2011 | Manson et al. | | 455/456.1 |
| 8,054,181 B2 | 11/2011 | Van Wyck Loomis et al. | | |
| 8,068,638 B2 * | 11/2011 | Malone et al. | | 382/100 |
| 8,082,582 B2 * | 12/2011 | Li et al. | | 726/17 |
| 8,095,656 B2 * | 1/2012 | McCormack | | 709/225 |
| 2003/0071899 A1 * | 4/2003 | Joao | | 348/148 |
| 2003/0190911 A1 | 10/2003 | Hirano | | |
| 2004/0024522 A1 | 2/2004 | Walker et al. | | |
| 2004/0044911 A1 | 3/2004 | Takada et al. | | |
| 2004/0078594 A1 * | 4/2004 | Scott | | 713/201 |
| 2004/0112238 A1 | 6/2004 | Talbot | | |
| 2004/0155969 A1 | 8/2004 | Hayashi | | |
| 2004/0198386 A1 | 10/2004 | Dupray | | |
| 2004/0243285 A1 | 12/2004 | Gounder | | |
| 2005/0154904 A1 | 7/2005 | Perepa et al. | | |
| 2005/0248444 A1 * | 11/2005 | Joao | | 340/426.13 |
| 2007/0005244 A1 * | 1/2007 | Nadkarni | | 701/213 |
| 2007/0055445 A1 | 3/2007 | Janky et al. | | |
| 2007/0087756 A1 | 4/2007 | Hoffberg | | |
| 2007/0155489 A1 | 7/2007 | Beckley et al. | | |
| 2007/0174467 A1 * | 7/2007 | Ballou et al. | | 709/227 |
| 2008/0018545 A1 | 1/2008 | Kaplan et al. | | |
| 2008/0086685 A1 * | 4/2008 | Janky et al. | | 715/700 |
| 2009/0005061 A1 | 1/2009 | Ward et al. | | |
| 2009/0322890 A1 * | 12/2009 | Bocking et al. | | 348/211.2 |
| 2010/0031024 A1 * | 2/2010 | Hayes | | 713/156 |
| 2012/0023333 A1 * | 1/2012 | Takada et al. | | 713/168 |

* cited by examiner

*Primary Examiner* — Syed A. Zia

(57) ABSTRACT

Embodiments of the present invention recite a method and system for implementing login protection and prevention to a Global Navigation Satellite System (GNSS) receiver. In one embodiment, a geospatial data collection device which is communicatively coupled with a GNSS receiver is authenticated. It is then determined that the geospatial data collection device is authorized to collect data from a geographic region in which the GNSS receiver is located. The geospatial data collection device is then permitted access to a control interface of the GNSS receiver.

12 Claims, 12 Drawing Sheets

FIGURE 6

| VENDOR IDENTIFICATION FIELD 610 | PRODUCT IDENTIFICATION FIELD 620 | DECRYPTION KEY FIELD 630 |
|---|---|---|
| VENDOR ID A 611a | PRODUCT ID A 621a | DECRYPTION KEY A 631a<br>SECOND DECRYPTION KEY 632a |
| VENDOR ID B 611b | PRODUCT ID B 621b | DECRYPTION KEY B 631b<br>SECOND DECRYPTION KEY 632b |
| VENDOR ID B 611b | PRODUCT ID C 621c | DECRYPTION KEY C 631c<br>SECOND DECRYPTION KEY 632c |

601

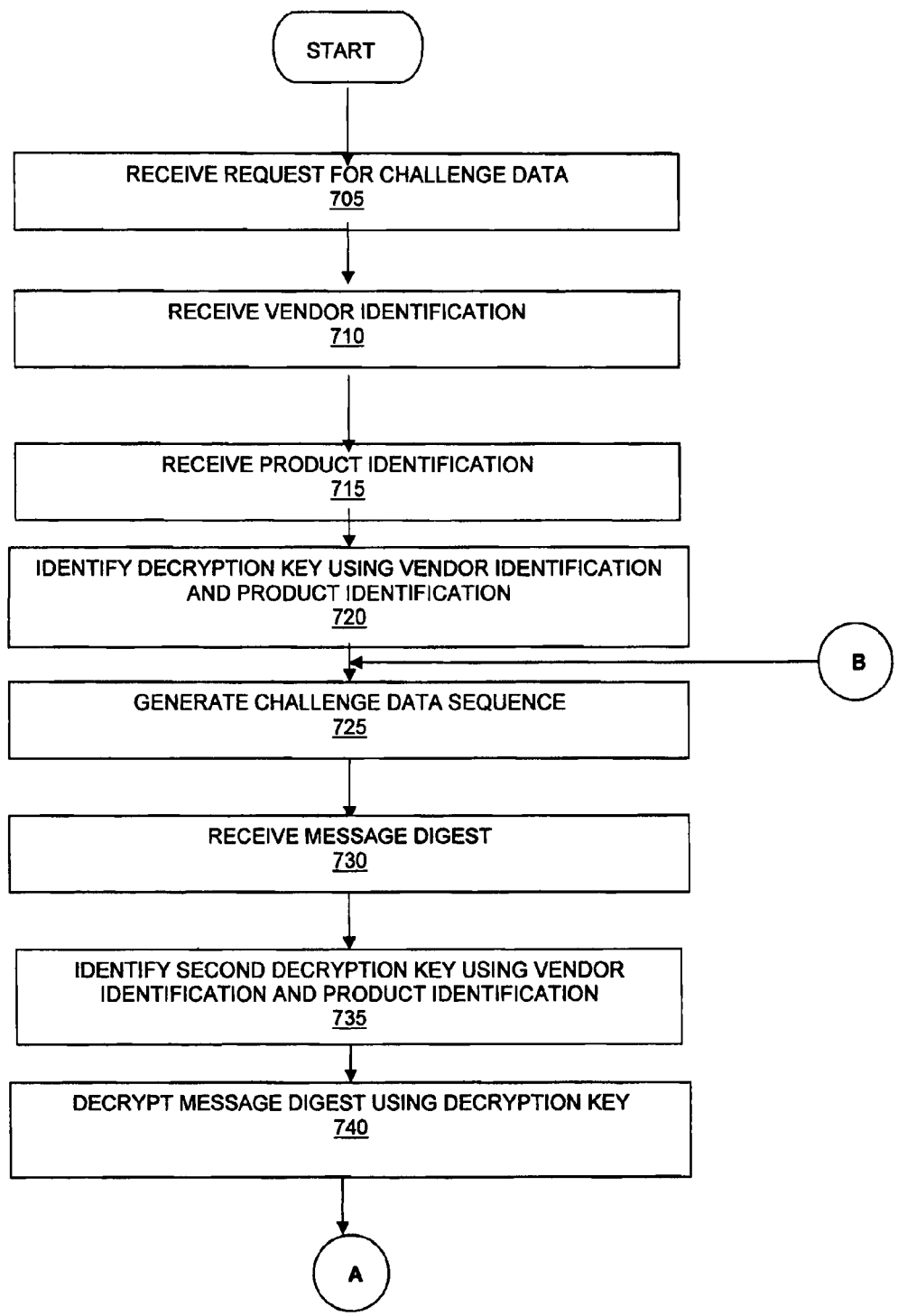

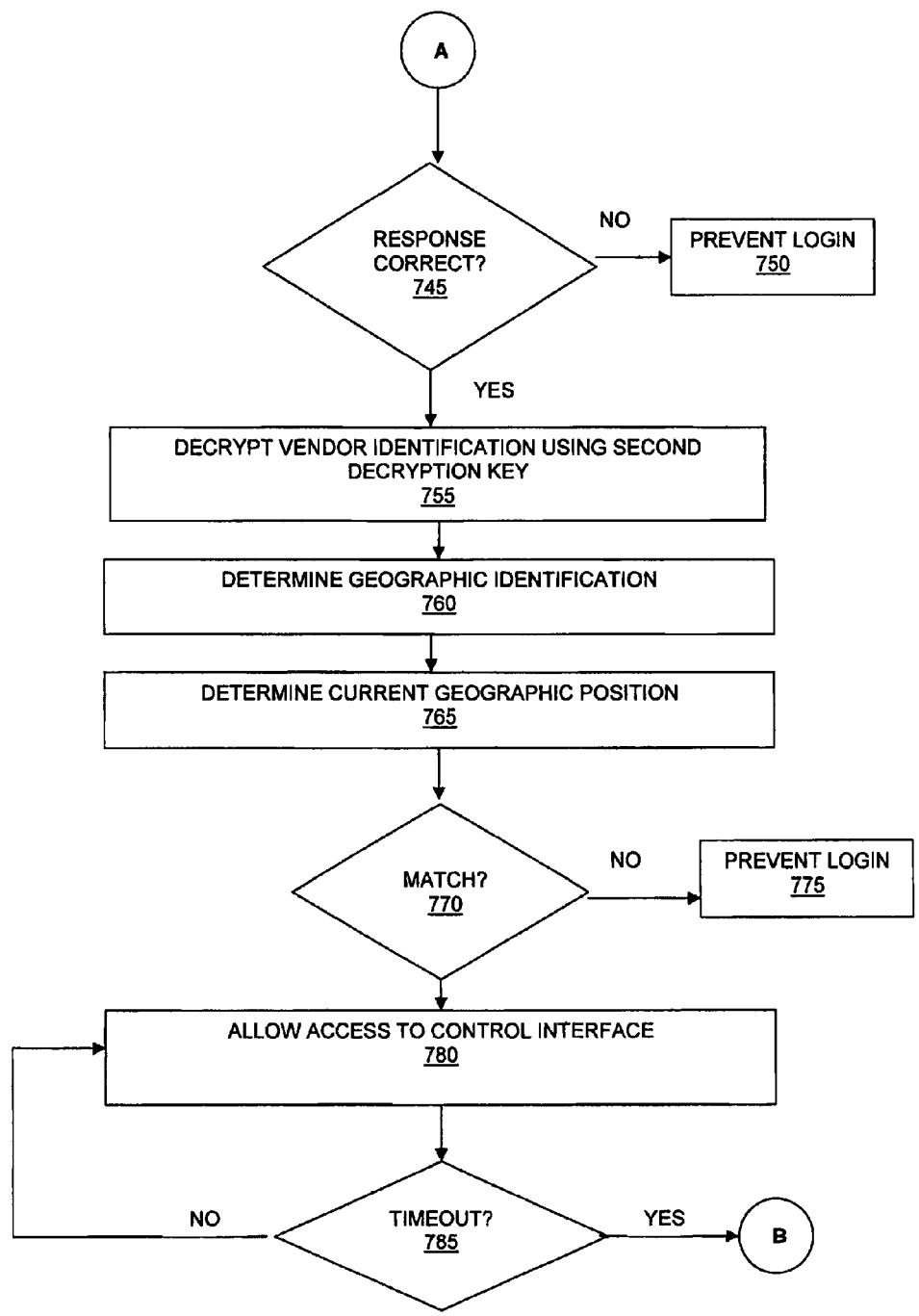

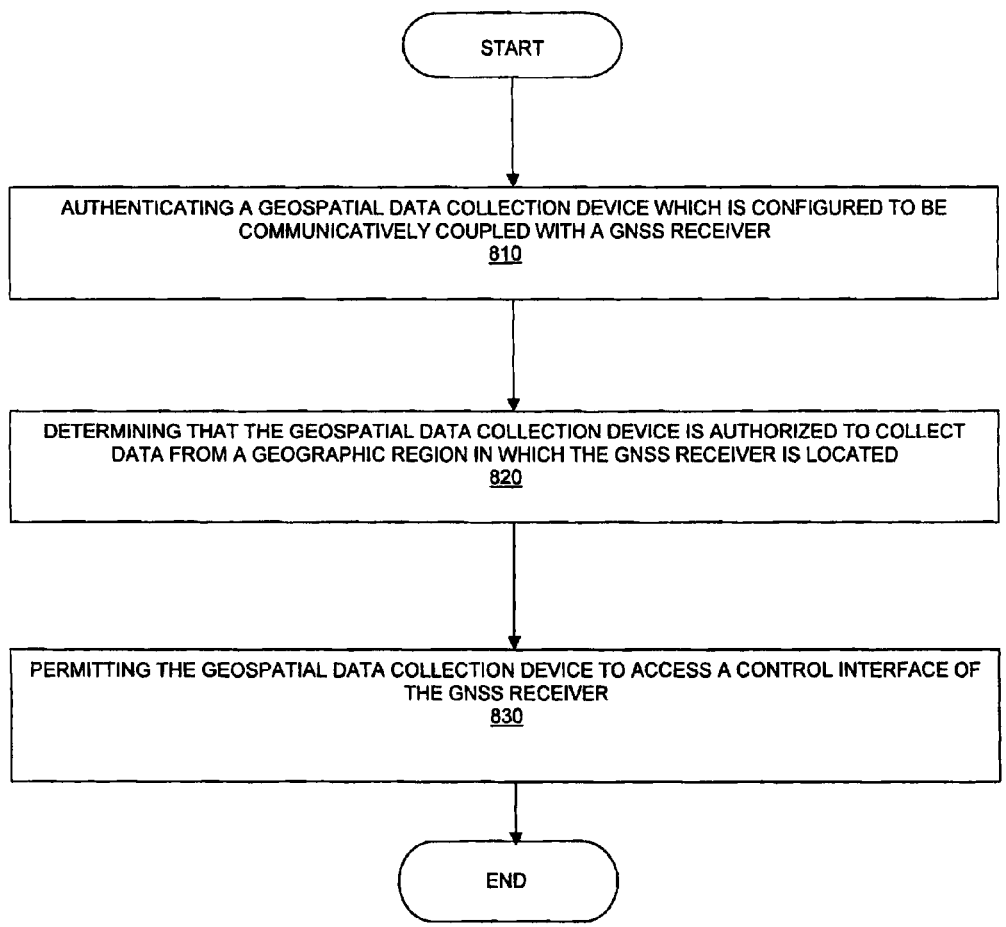

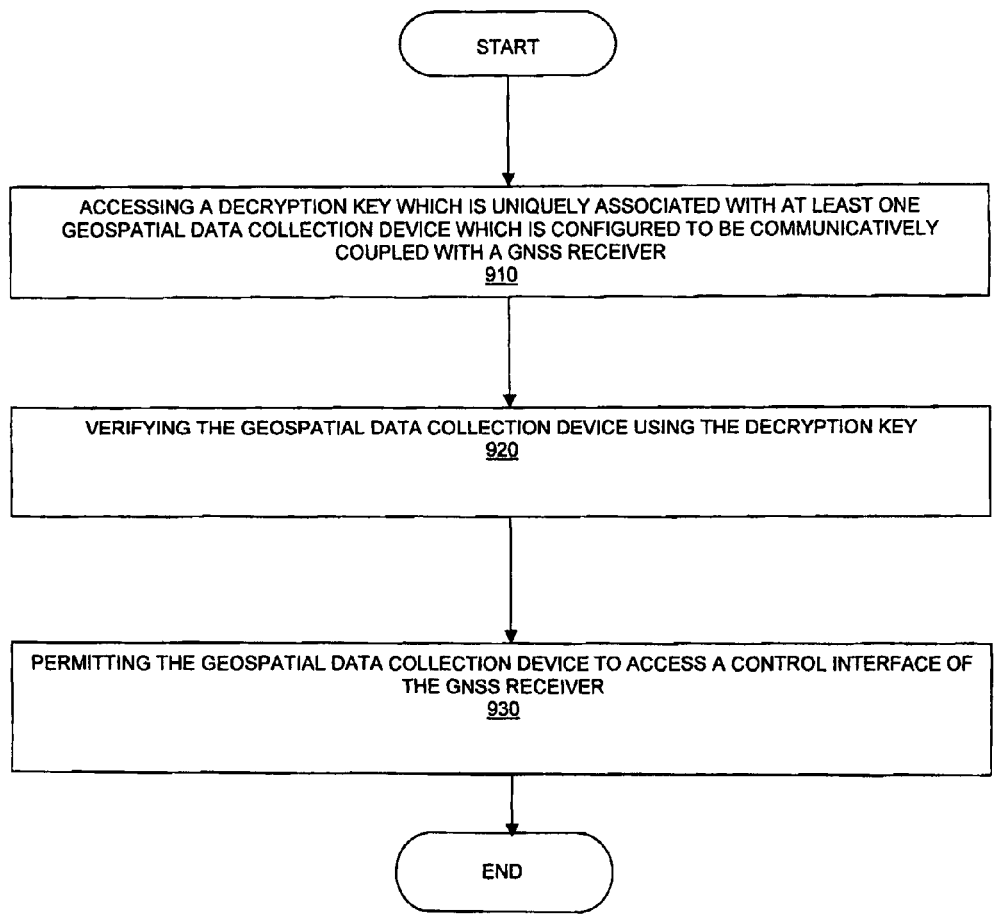

METHOD AND SYSTEM FOR GNSS RECEIVER LOGIN PROTECTION AND PREVENTION

FIELD OF THE INVENTION

Embodiments of the present invention are related to geographic data reporting systems.

BACKGROUND OF THE INVENTION

Geographic data is increasingly used to provide geo-spatial data to a wide variety of business, government, and academic applications. Increasingly, remote Global Navigation Satellite System (GNSS) receivers are used to collect data which can then be retrieved by a data collection device. For example, the GNSS receivers can be used to monitor ground movement due to plate tectonics. The GNSS receivers are typically in communication, either via a wired or wireless communication network, with a data collection device which may be hundreds of miles away.

In order to access the data collected by the GNSS receiver, the data collection device accesses a command and control interface of the GNSS device. Using this interface, the data collection device can also change configuration parameters of the GNSS receiver. In some instances, the protocol for the command interface for GNSS receivers has essentially become publicly available. As a result, un-authorized users may also access the control interface and re-configure the GNSS receiver, or retrieve data.

SUMMARY OF THE INVENTION

Embodiments of the present invention recite a method and system for implementing login protection and prevention to a Global Navigation Satellite System (GNSS) receiver. In one embodiment, a geospatial data collection device which is communicatively coupled with a GNSS receiver is authenticated. It is then determined that the geospatial data collection device is authorized to collect data from a geographic region in which the GNSS receiver is located. The geospatial data collection device is then permitted access to a communication interface of the GNSS receiver.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 6 shows an exemplary look-up table used in accordance with embodiments of the present invention.

FIGS. 7A and 7B are a flowchart used by a login protection and prevention system in accordance with an embodiment of the present invention FIG. 8 is a flowchart of a method for implementing login protection to a Global Navigation Satellite System (GNSS) receiver in accordance with an embodiment of the present invention.

FIG. 9 is a flowchart of another method for implementing login protection to a Global Navigation Satellite System (GNSS) receiver in accordance with an embodiment of the present invention.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "authenticating," "determining," "permitting," "receiving," "conveying," "verifying," "accessing," "deriving," "using," "comparing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
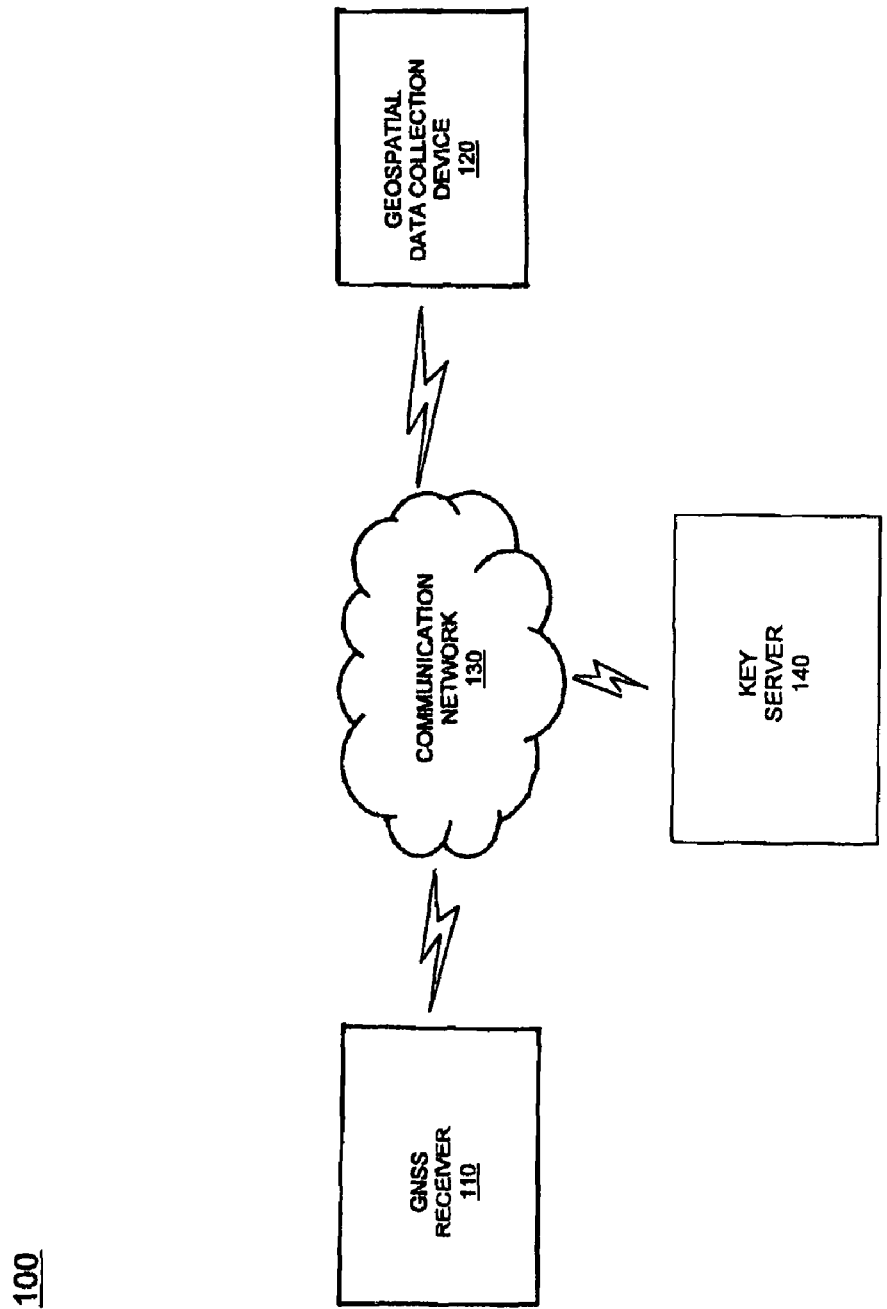
FIG. 1 is a block diagram of exemplary components used in accordance with embodiments of the present invention.

FIG. 1 is a block diagram of exemplary components used in accordance with embodiments of the present invention. In the embodiment of FIG. 1, a Global Navigation Satellite System (GNSS) receiver 110 is communicatively coupled with a geospatial data collection device 120 via a communication network 130. In another embodiment of the present invention, GNSS receiver 110 and geospatial data collection device 120 are communicatively coupled via an optional key server 140. In embodiments of the present invention, GNSS receiver 110 is a device which determines its geographic position and is capable of conveying the collected position data to another device using a positioning system such as the Global Navigation Satellite System (GNSS). Embodiments of a GNSS receiver in accordance with the present invention may utilize, but are not limited to, satellite position determining systems such as embodiments of the Global Positioning System (GPS), the GLONASS system, the Radio Navigation Satellite Service (RNSS), the Galileo system, the Quazi-zenith Satellite System (QZSS), and the Compass Navigation System.

In embodiments of the present invention, geospatial data collection device 120 is an electronic device which is used to collect geospatial data. For example, in one embodiment, geospatial data collection device 120 is a Geographic Information System (GIS) data collector. In another embodiment, geospatial data collection device 120 is a Personal Digital Assistant (PDA). In another embodiment, geospatial data collection device 120 is a laptop computer system. In another embodiment, geospatial data collection device 120 is a personal computer system. In another embodiment, geospatial data collection device 120 is a position data server. In general, geospatial data collection device 120 utilizes a software program to interact with a command and control interface of GNSS receiver 110 in order to configure, or collect data from, GNSS receiver 110.

In embodiments of the present invention, communication network 130 is a wireless communication network. In another embodiment, communication network 130 is a "wired" network which utilizes landlines to communicatively couple GNSS receiver 110 and geospatial data collection device 120. It is noted that the communicative coupling between GNSS receiver 110, geospatial data collection device 120, and/or key server 140 may be a direct connection between those devices. For example, GNSS receiver 110 and geospatial data collection device 120, and/or key server 140 may be directly coupled via a Bluetooth wireless connection, a radio link, an infrared communication link, or optical communication link. Alternatively, GNSS receiver 110, geospatial data collection device 120, and/or key server 140 may be directly coupled via a data cable.

In embodiments of the present invention, GNSS receiver 110 utilizes a system (e.g., system 500 of FIG. 5) which protects GNSS receiver 110 from unauthorized login and thus prevents data collected by GNSS receiver from being used by unauthorized users. Alternatively, system 500 may be implemented by key server 140 which permits geospatial data collection device 120 to access GNSS receiver 110 once a login procedure is completed. In one embodiment of the present invention, GNSS receiver 110 utilizes the Trimcomm™ interface by Trimble Navigation Limited, 935 Stewart Drive Sunnyvale, Calif., 94085. The Trimcomm™ interface is a well known format which can be used to configure a GNSS receiver (e.g., GNSS receiver 110) and issue commands including commands causing GNSS receiver 110 to send geographic position data. In another embodiment, GNSS receiver 110 utilizes the Trimble Standard Interface Protocol (TSIP), also by Trimble Navigation Limited, 935 Stewart Drive Sunnyvale, Calif., 94085. It is noted that while the present embodiments cite these interfaces specifically, embodiments of the present invention are not limited to these interfaces alone and are well suited for login prevention and protection of other command/configuration interfaces.

In one embodiment of the present invention, GNSS receiver 110, or key server 140, verifies the identity of geospatial data collection device 120 before allowing it to access the control interface of GNSS 110. In one embodiment, GNSS receiver 110, or key server 140, accesses a decryption key which is associated with geospatial data collection device 120.

In another embodiment, GNSS receiver 110, or key server 140, determines a geographic region identification descriptive of geospatial data collection device 120. GNSS receiver 110, or key server 140, then determines whether the geographic region identification corresponds to its current geographic position. If the geographic region identification of geospatial data collection device 120 corresponds to the current geographic position of GNSS receiver 110, GNSS receiver 110, or key server 140, permits geospatial data collection device 120 to access the control interface of GNSS receiver 110.

In another embodiment, GNSS receiver 110, or key server 140, first verifies the identity of geospatial data collection device 120. If GNSS receiver 110, or key server 140, verifies the identity of geospatial data collection device 120, it then determines whether a geographic region identification descriptive of geospatial data collection device 120 corresponds to the current geographic position of GNSS receiver 110. If the geographic region identification of geospatial data collection device 120 corresponds to the current geographic position of GNSS receiver 110, GNSS receiver 110, or key server 140, permits geospatial data collection device 120 to access the control interface of GNSS receiver 110. In another embodiment, GNSS receiver 110, or key server 140, first determines whether a geographic region identification descriptive of geospatial data collection device 120 corresponds to the current geographic position of GNSS receiver 110, If the geographic region identification of geospatial data collection device 120 corresponds to the current geographic position of GNSS receiver 110, GNSS receiver 110, or key server 140, then verifies the identity of geospatial data collection device 120. If GNSS receiver 110, or key server 140, verifies the identity of geospatial data collection device 120, it then permits geospatial data collection device 120 to access the control interface of GNSS receiver 110.

Figure 2:
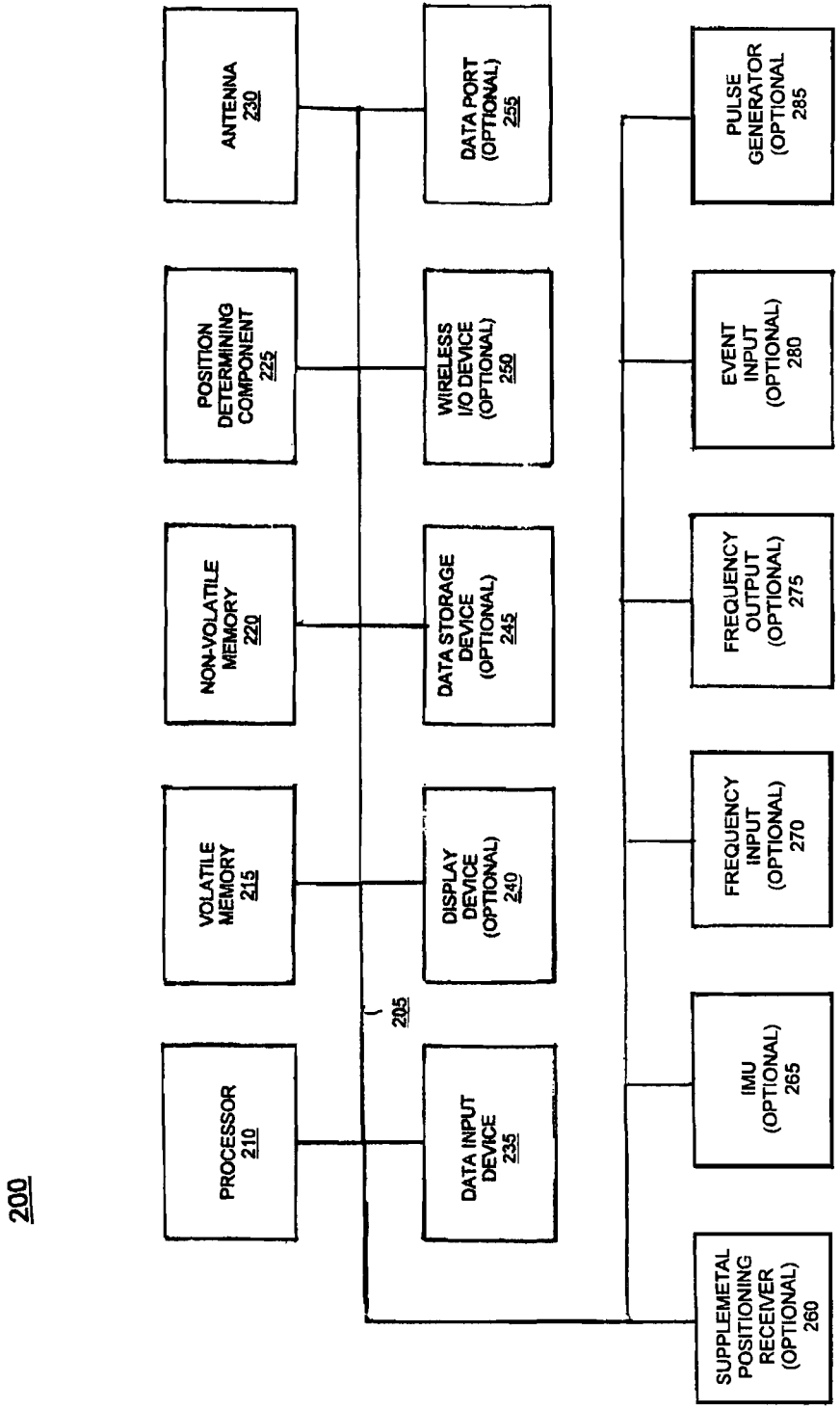
FIG. 2 is a block diagram of an exemplary Global Navigation Satellite System (GNSS) receiver in accordance with embodiments of the present invention.

FIG. 2 is a block diagram of an exemplary Global Navigation Satellite System (GNSS) receiver (e.g., 110 of FIG. 1) in accordance with embodiments of the present invention. In the embodiment of FIG. 2, GNSS receiver 110 comprises an address/data bus 205 for conveying digital information between the various components, a central processor unit (CPU) 210 for processing the digital information and instructions, a volatile memory 215 comprised of volatile random access memory (RAM) for storing the digital information and instructions, and a non-volatile read only memory (ROM) 220 for storing information and instructions of a more permanent nature.

GNSS receiver 110 further comprises a position determining component 225 for determining the geographic position (e.g., latitude and longitude) of GNSS receiver 110. It is noted that in embodiments of the present invention, position determining component 225 may be capable of determining additional data such as the height of GNSS receiver 110 and/or the current time. In another embodiment of the present invention, the satellite measurement data from satellites in view of GNSS receiver 110 may be utilized without further processing to determine the geographic position of GNSS receiver 110. In embodiments of the present invention, GNSS receiver 110 further comprises an antenna 230 coupled with position determining component 225. As discussed above, while the present embodiment specifically cites a GNSS position determining system, embodiments of the present invention are well suited to utilize a variety of terrestrial-based and satellite-based position determining systems as well.

GNSS receiver 110 further comprises an optional data input device 235 (e.g., a keyboard, a cursor control device, a touch screen assembly, a track-ball, joystick, or special keys on alpha-numeric input 107 capable of signaling movement of a given direction or manner displacement, etc. GNSS receiver 110 further comprises an optional data display device 240. In addition, GNSS receiver 110 may also include an optional data storage device 245 (e.g., a magnetic, optical, floppy, or tape drive or the like) for storing vast amounts of data. In one embodiment, data storage device 245 is a removable data storage device. It should be noted that the software program for performing GNSS receiver login protection and prevention of the present invention may be stored either in volatile memory 215 or data storage device 245.

In the embodiment of FIG. 2, GNSS receiver 110 further comprises an optional wireless input/output (I/O) device 250 and an optional data port 255 for communicatively coupling GNSS receiver 110 with, for example, geospatial data collection device 120 using a data cable.

In the embodiment of FIG. 2, GNSS receiver 110 further comprises an optional supplemental positioning receiver 260. In embodiments of the present invention, supplemental positioning receiver 260 utilizes signals from sources other than GNSS satellites to determine the geographic position of GNSS receiver 110. In embodiments of the present invention, these signals include, but are not limited to cellular telephone signals, digital television signals, Long Range Radio Aid to Navigation (LORAN) signals, etc.

In the embodiment of FIG. 2, GNSS receiver 110 further comprises an optional inertial measurement unit (IMU) 265. In embodiments of the present invention, inertial measurement unit 265 detects changes in the motion of GNSS receiver 110 which can be used to determine the geographic position of GNSS receiver 110. In one embodiment of the present invention, inertial measurement unit 265 utilizes a gyroscope to detect changes in the motion of GNSS receiver 110. In another embodiment, inertial measurement unit 265 utilizes at least one accelerometer to detect changed in the motion of GNSS receiver 110. It is noted that in one embodiment, an accelerometer capable of detecting a change of motion in more than one axis or plane of motion may be used by inertial measurement unit 265.

In the embodiment of FIG. 2, GNSS receiver 110 also comprises an optional frequency input 270. In embodiments of the present invention, frequency input 270 receives a reference frequency output by a device (e.g., a GNSS reference station). GNSS receiver 110 may then synchronize to the frequency received by frequency input 270.

In the embodiment of FIG. 2, GNSS receiver 110 also comprises an optional frequency output 275. In embodiments of the present invention, GNSS receiver 110 may output a reference frequency which is used by other devices for synchronization as described above.

In the embodiment of FIG. 2, GNSS receiver 110 also comprises an optional event input 280. In embodiments of the present invention, GNSS receiver 110 can record an event and timestamp the event using event input 280.

In the embodiment of FIG. 2, GNSS receiver 110 also comprises an optional pulse generator 285. In embodiments of the present invention, pulse generator 285 generates a one second pulse in response to a timestamp event initiated by event input 280. It is noted that the timing of the pulse generated by pulse generator 285 may have a higher or lower frequency than one pulse per second in embodiments of the present invention. Additionally, pulse generator 285 may generate some other trigger in response to a timestamp event in embodiments of the present invention.

Figure 3:
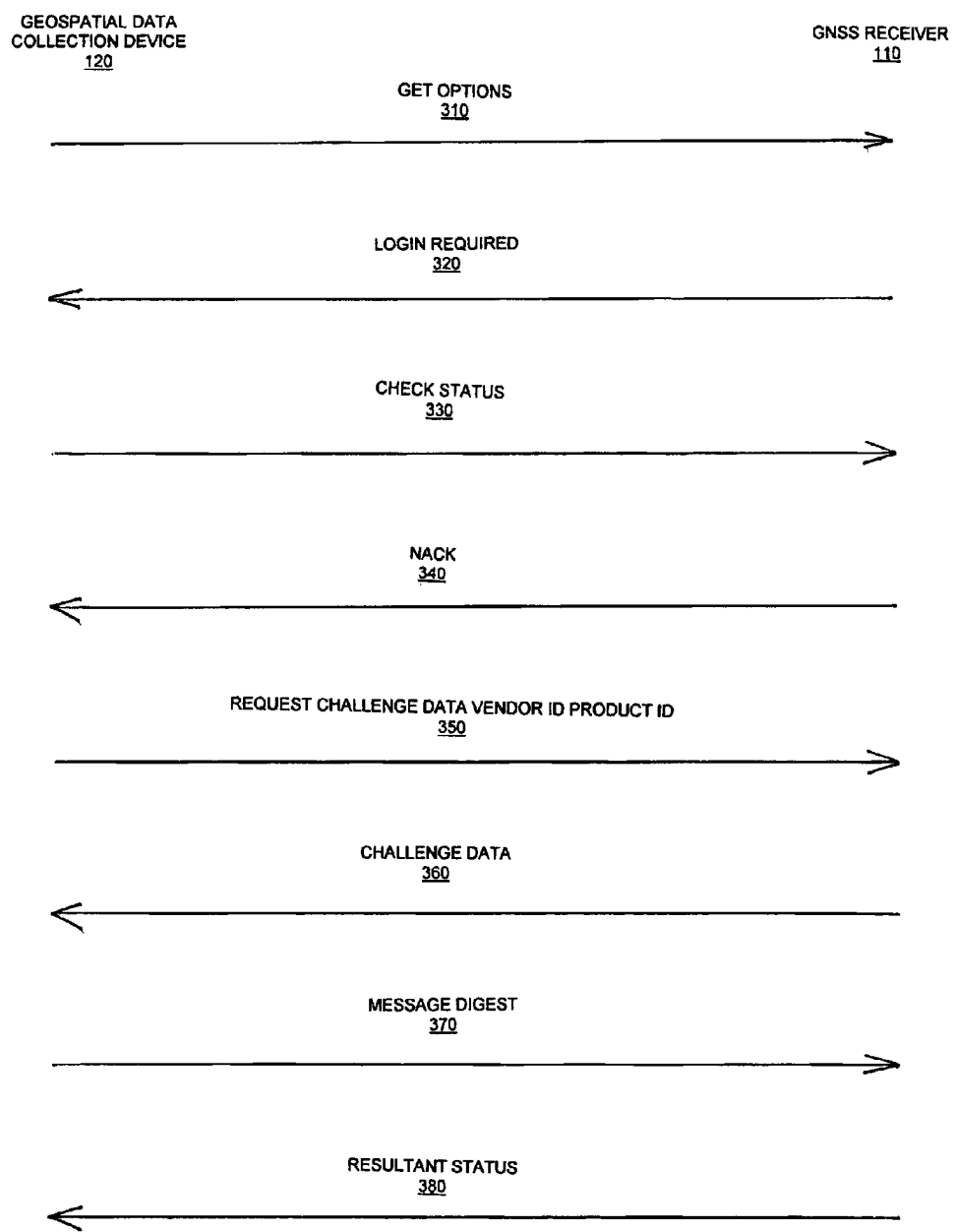
FIG. 3 shows an exemplary exchange of communications in accordance with an embodiment of the present invention.

FIG. 3 shows an exemplary exchange of communications in accordance with an embodiment of the present invention. It is noted that while in the embodiment of FIG. 3, communications are shown between geospatial data collection device 120 and GNSS receiver 110, in another embodiment the exchange of communications is between geospatial data collection device 120 and key server 140. In other words, the messages received and generated by GNSS receiver 110 and/or other functions described with reference to FIG. 3 may instead be received and generated and/or performed by key server 140 in embodiments of the present invention. In the embodiment of FIG. 3, geospatial data collection device 120 generates a message (e.g., Get Options 310) to GNSS receiver 110 to determine whether a login procedure is necessary in order to access the control interface of GNSS receiver 110. In another embodiment, geospatial data collection device 120 generates the message (e.g., Get Options 310) to key server 140 to determine whether a login procedure is necessary in order to access the control interface of GNSS receiver 110, or receive data therefrom.

GNSS receiver 110, or key server 140, then generates a reply (e.g., Login Required 320) which informs geospatial data collection device 120 that a login is required in order to access the control interface of GNSS receiver 110, or to receive data therefrom.

Geospatial data collection device 120 then generates a Check Status message (e.g., 330) to determine whether it is currently logged into the command interface of GNSS receiver 110, or whether it is currently logged in with key server 140.

GNSS receiver 110 then generates a Negative Acknowledgement reply (e.g., Nack 340) which informs geospatial data collection device 120 that it is not currently logged into the command interface of GNSS receiver 110. Alternatively, key server 140 may generate a Negative Acknowledgement reply (e.g., Nack 340) which informs geospatial data collection device 120 that it is not yet logged in with key server 140.

Geospatial data collection device 120 then generates a request for challenge data (e.g., 350) along with a vendor identification and a product identification. As is discussed in greater detail below, the vendor identification is a unique identifier of a party who is authorized to sell GNSS receiver 110, while the product identification uniquely identifies the model number, series, or version, of GNSS receiver 110. In another embodiment of the present invention, a unique identification of a user of GNSS receiver and/or geospatial data collection device 120 may be used. For example, in one embodiment, in addition to generating a request for challenge data (e.g., 350) an identification unique to the user of geospatial data collection device 120 may be sent. It is noted that embodiments of the present invention are not limited to using a product identification, vendor identification, and/or user identification to identify geospatial data collection device 120 or GNSS receiver 110.

In response to receiving the request for challenge, GNSS receiver 110, or key server 140, generates a challenge, or sequence, (e.g., 360) which will be used to authenticate the identity of geospatial data collection device 120. In embodiments of the present invention, the challenge comprises, but is not limited to, a 14-byte sequence which is generated using a hash function in conjunction with an input sequence and a private key which is shared by GNSS receiver 110 and geospatial data collection device 120. In one embodiment, the input sequence comprises the serial number of GNSS receiver 110 and the current time.

Upon receiving the challenge (e.g., from GNSS receiver 110, or from key server 140) geospatial data collection device 120 generates a challenge response, or message digest, (e.g., 370) which is sent to GNSS receiver 110, or to key server 140. In one embodiment, the message digest generated by geospatial data collection device 120 comprises a 16-byte response. In embodiments of the present invention, generating the message digest comprises geospatial data collection device 120 encrypting the challenge data sent by GNSS receiver 110, or key server 140, using the private key discussed above in conjunction with a hashing function which is similar to that used by GNSS receiver 110, or key server 140. The resulting encrypted message digest is then sent to GNSS receiver 110, or key server 140.

Upon receiving the message digest (e.g., 370), GNSS receiver 110, or key server 140, tests the message digest sent by geospatial data collection device 120 and sends a status message (e.g., 380) which informs geospatial data collection device 120 if the login attempt has been successful. In embodiments of the present invention, status message 380 may tell geospatial data collection device 120 that the login attempt has failed, is successful, and how long before re-authentication is required, if a timeout is implemented by GNSS receiver 110, or key server 140. In one embodiment of the present invention, if key server 140 determines that a login attempt by geospatial data collection device 120 is successful, a message may be generated by key server 140 to GNSS receiver 110 which facilitates the accessing of GNSS receiver 110 by geospatial data collection device 120. In other words, key server 140 permits geospatial data collection device 120 to access GNSS receiver 110. In one embodiment, key server 140 may enable of communication pathway between GNSS receiver 110 and geospatial data collection device 120.

As described above, in one embodiment, testing the message digest 370 by GNSS receiver 110, or key server 140, comprises accessing the private key for geospatial data collection device 120 and determining whether message digest 370 comprises the correct response to challenge data 360. In other words, message digest 370 is decrypted using the hashing function in conjunction with the private key. If geospatial data collection device 120 provides the correct response to challenge data 360, its identity is considered to be authenticated. In another embodiment, GNSS receiver 110, or key server 140, determines whether geospatial data collection device 120 is authorized to configure, or collect data from, a GNSS receiver in the geographic region in which GNSS receiver 110 is located.

In another embodiment, GNSS receiver 110, or key server 140, first authenticates the identity of geospatial data collection device 120 and then determines whether geospatial data collection device 120 is authorized to configure, or collect data from, a GNSS receiver in the geographic region in which GNSS receiver 110 is located (or vice versa). In embodiments of the present invention, determining whether geospatial data collection device 120 is authorized to configure, or collect data from, a GNSS receiver in the geographic region in which GNSS receiver 110 is located is accomplished decrypting a geographic region identification which comprises a portion of the vendor identification sent to GNSS receiver 110, or key server 140, in the request for challenge data (e.g., 350). In embodiments of the present invention, this is decrypted using a second decryption key which is not shared with geospatial data collection device 120. In one embodiment, the second decryption key may comprise a portion of the shared private key that is used to authenticate the identity of geospatial data collection device 120. In another embodiment, the shared private key may be used to decrypt the geographic region identification from the vendor identification.

Figure 4:
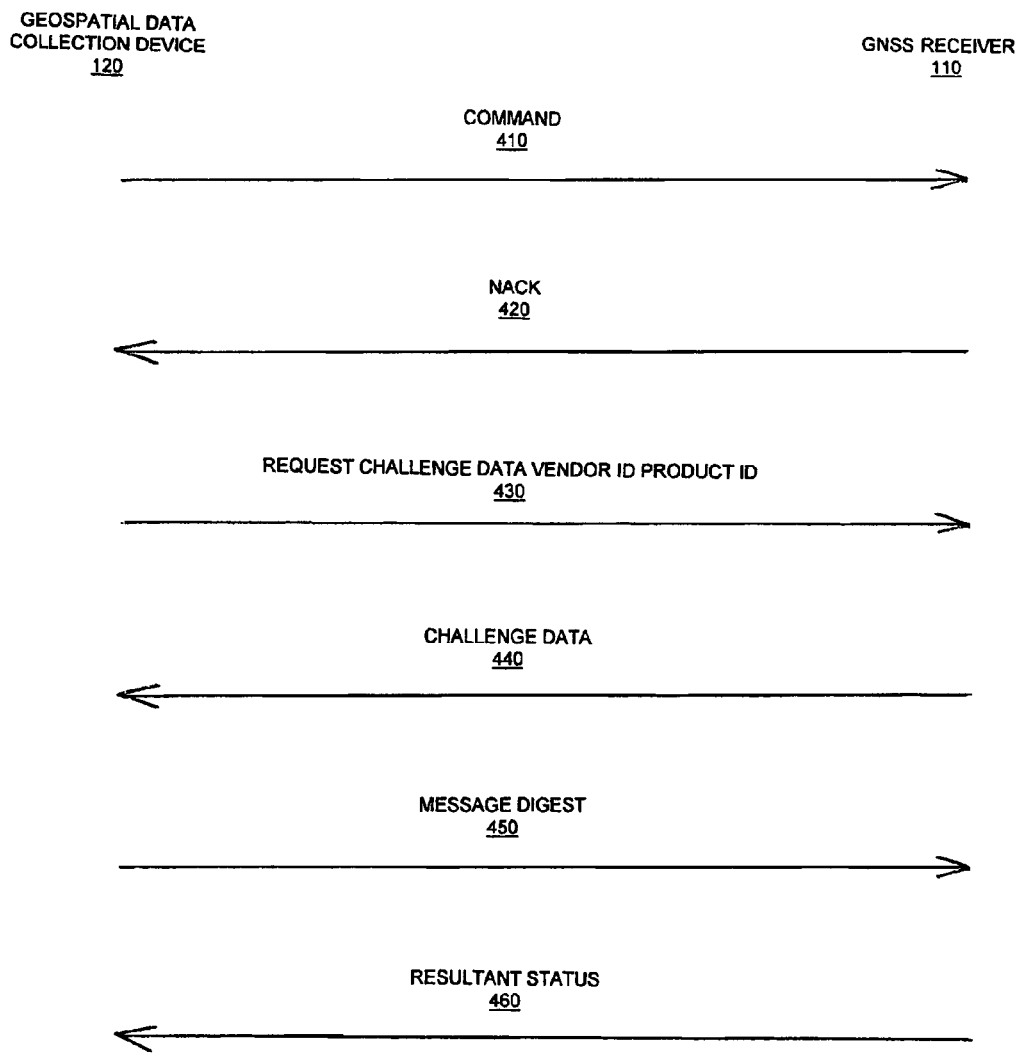
FIG. 4 shows an exemplary exchange of communications in accordance with another embodiment of the present invention.

FIG. 4 shows an exemplary exchange of communications in accordance with another embodiment of the present invention. Geospatial data collection-device 120 generates a command (e.g., 410) to GNSS receiver 110. In embodiments of the present invention, the command generated by geospatial data collection device 120 is a command to configure GNSS receiver 110, or to retrieve data from GNSS receiver 110 via its command interface (e.g., the Trimcomm™ interface, the TSIP interface, or the like).

GNSS receiver 110 then generates a Negative Acknowledgement reply (e.g., Nack 420) which informs geospatial data collection device 120 that it is not currently logged into the command interface of GNSS receiver 110, or with key server 140, and cannot therefore utilize the command interface to generate commands for GNSS receiver 110, or receive data therefrom.

Geospatial data collection device 120 then generates a request for challenge data (e.g., 430) along with a vendor identification and a product identification.

In response to receiving the request for challenge, GNSS receiver 110, or key server 140, generates a challenge, or sequence, (e.g., 440) which will be used to authenticate the identity of geospatial data collection device 120. In embodiments of the present invention, the challenge comprises a 14-byte sequence which is generated using a hash function in conjunction with an input sequence and a private key which is shared by GNSS receiver 110 and geospatial data collection device 120. In one embodiment, the input sequence comprises the serial number of GNSS receiver 110 and the current time. In another embodiment in accordance with the present invention GNSS receiver 110, or key server 140, generates a random number and, optionally, the current time or serial number of geospatial data collection device 120 which will be used to authenticate the identity of geospatial data collection device 120.

Upon receiving the challenge from GNSS receiver 110, geospatial data collection device 120 generates a challenge response, or message digest, (e.g., 450) which is sent to GNSS receiver 110, or key server 140. In one embodiment, the message digest generated by geospatial data collection device 120 comprises a 16-byte response. In embodiments of the present invention, generating the message digest comprises geospatial data collection device 120 encrypting the challenge data sent by GNSS receiver 110 using the private key discussed above in conjunction with a hashing function which is similar to that used by GNSS receiver 110. The resulting encrypted message digest is then sent to GNSS receiver 110, or key server 140.

Upon receiving the message digest (e.g., 450), GNSS receiver 110, or key server 140, tests the message digest sent by geospatial data collection device 120 and sends a status message (e.g., 460) which informs geospatial data collection device 120 if the login attempt has been successful. In embodiments of the present invention, status message 460 may tell geospatial data collection device 120 that the login attempt has failed, is successful, and how long before re-authentication is required, if a timeout is implemented by GNSS receiver 110, or key server 140.

As described above, in one embodiment, testing the message digest 450 by GNSS receiver 110, or key server 140, comprises accessing the private key for geospatial data collection device 120 and determining whether message digest 450 comprises the correct response to challenge data 440. In other words, message digest 450 is decrypted using the hashing function in conjunction with the private key. If geospatial data collection device 120 provides the correct response to challenge data 440, its identity is considered to be authenticated. In another embodiment, GNSS receiver 110 determines whether geospatial data collection device 120 is authorized to configure, or collect data from, a GNSS receiver in the geographic region in which GNSS receiver 110 is located. In another embodiment, key server 140 determines whether geospatial data collection device 120 is authorized to configure, or collect data from, a GNSS receiver in the geographic region in which GNSS receiver 110 is located.

In another embodiment, GNSS receiver 110, or key server 140, first authenticates the identity of geospatial data collection device 120 and then determines whether geospatial data collection device 120 is authorized to configure, or collect data from, a GNSS receiver in the geographic region in which GNSS receiver 110 is located (or vice versa). In embodiments of the present invention, determining whether geospatial data collection device 120 is authorized to configure, or collect data from, a GNSS receiver in the geographic region in which GNSS receiver 110 is located is accomplished decrypting a geographic region identification which comprises a portion of the vendor identification sent to GNSS receiver 110 in the request for challenge data (e.g., 430). In embodiments of the present invention, this is decrypted using a second decryption key which is not shared with geospatial data collection device 120. In one embodiment, the second decryption key may comprise a portion of the shared private key that is used to authenticate the identity of geospatial data collection device 120. In another embodiment, the shared private key may be used to decrypt the geographic region identification from the vendor identification. In embodiments of the present invention, the second decryption key may be kept by GNSS receiver 110 or by key server 140.

Figure 5:
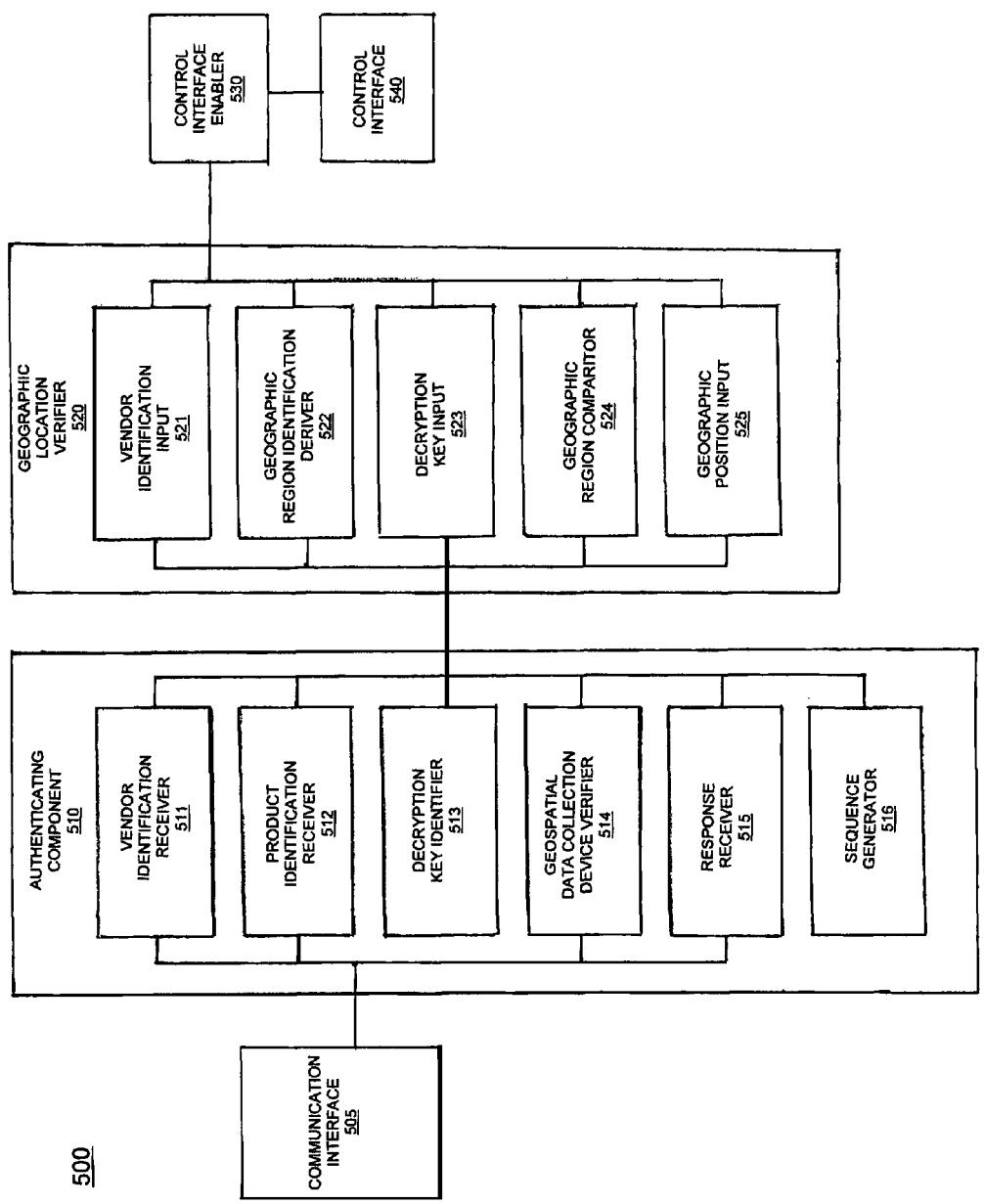
FIG. 5 is a block diagram of an exemplary login protection and prevention system in accordance with an embodiment of the present invention.

FIG. 5 is a block diagram of an exemplary login protection and prevention system in accordance with an embodiment of the present invention. In embodiments of the present invention, system 500 may be implemented as software and/or firmware instructions which are implemented by GNSS receiver 110 or by key server 140 in embodiments of the present invention. In one embodiment, the components of system 500 may be implemented by processor 210 of FIG. 2. Other components of system 500 may be implemented as discreet hardware components of GNSS receiver 110 or of key server 140. In the embodiment of FIG. 5, system 500 comprises a communication interface 505. In one embodiment, communication interface 505 comprises a wireless communication interface (e.g., wireless input/output (I/O) device 250 of FIG. 2 above). In another embodiment, communication interface 505 comprises a wired communication interface (e.g., data port 255 of FIG. 2 above). As shown in FIG. 5, system 500 further comprises an authenticating component 510 which is communicatively coupled with communication interface 505. The embodiment of FIG. 5 further comprises a geographic location verifier 520 which is communicatively coupled with authenticating component 510 and with a control interface enabler 530. Control interface enabler 530 is in turn communicatively coupled with control interface 540.

In one embodiment of the present invention, system 500 uses authenticating component 510 to authenticate the identity of geospatial data collection device 120. In one embodiment, if geospatial data collection device 120 is authenticated, system 500 then uses geographic location verifier 520 to determine whether geospatial data collection device 120 is authorized to configure and/or collect data from a geographic region in which GNSS receiver 110 is currently located. If geospatial data collection device 120 is authorized to configure and/or collect data from the geographic region in which GNSS receiver 110 is currently located, interface enabler 530 permits geospatial data collection device 120 to access control interface 540 of GNSS receiver 110. It is noted that in another embodiment, determining the geographic region in which geospatial data collection device 120 is authorized to configure and/or collect data may be performed prior to, or simultaneous with, authenticating the identity of geospatial data collection device 120. In another embodiment of the present invention, interface enabler 530 generates a message to GNSS receiver 110 which permits geospatial data collection device 120 to access the control interface of GNSS receiver 110. In another embodiment, interface enabler 530 communicatively couples GNSS receiver 110 and geospatial data collection device 120 in a communications pathway.

In the embodiment of FIG. 5, authenticating component 510 is for authenticating the identity of, for example, data collection device 120. In FIG. 5, authenticating component 510 further comprises a vendor identification receiver 511 which is for receiving vendor identification from geospatial data collection device 120 and a product identification receiver 512 which is for receiving a product identification from data collection device 120. As discussed above with reference to FIGS. 3 and 4, the vendor identification and product identification may be conveyed during request for challenge data (e.g., 350 and 430 of FIGS. 3 and 4 respectively). In embodiments of the present invention, a vendor identification is a unique identifier of a party who is authorized to sell GNSS receiver 110, while the product identification uniquely identifies the model number, series, or version, of GNSS receiver 110. In one embodiment, the vendor identification comprises a 40-bit sequence of numbers and/or letters. However, embodiments of the present invention are not limited to a 40-bit sequence alone. Alternatively, an identification of the user of geospatial data collection device 120 which is used by authenticating component 510.

In embodiments of the present invention, authenticating component 510 further comprises a decryption key identifier 513 which is coupled with vendor identification receiver 511 and product identification receiver 512. In embodiments of the present invention, GNSS receiver 110, or key server 140, uses the vendor identification and the product identification to identify a decryption key based which is uniquely identified by the combination of the vendor identification, or user identification, and the product identification. In one embodiment, GNSS receiver 110 utilizes a look-up table to identify the correct decryption key as described below with reference to FIG. 4.

FIG. 6 shows an exemplary look-up table 601 used in accordance with embodiments of the present invention. In embodiments of the present invention, each vendor of geospatial data collection device 120 and/or GNSS receiver 110 is assigned a private key which is uniquely identified by GNSS receiver 110, or key server 140, using a vendor identification, or user identification, and product identification provided by geospatial data collection device 120. In one embodiment, decryption key identifier 513 utilizes a look-up table similar to look-up table 601 described below to determine which decryption key is identified by a particular combination of a vendor or user identification and product identification.

In the embodiment of FIG. 6, look-up table 601 comprises a vendor identification field 610, a product identification field 620, and a decryption key field 630. It is noted that while look-up table 601 utilizes a vendor identification field 610, other embodiments of the present invention may use some other form of identification, such as a user identification, in addition to, or instead of, vendor identification field 610. In embodiments of the present invention, a shared private key (e.g., a decryption key) is identified by GNSS receiver 110 using the vendor identification and the product identification received from geospatial data collection device 120. For example, if GNSS receiver 110 receives the vendor identification A (e.g., 611a) from vendor A and the product identification A (e.g., 621a) from geospatial data collection device 120, it can then determine that the correct decryption key for authenticating geospatial data collection device 120 is decryption key 631a. In the embodiment of FIG. 6, a second decryption key (e.g., 632a) is also identified based upon the vendor identification and product identification provided by geospatial data collection device 120.

As will be discussed below, embodiments of the present invention use a second decryption key (e.g., 632a) to decrypt a portion of the vendor identification in order to derive a geographic region identification. In embodiments of the present invention, the geographic region identification facilitates determining whether geospatial data collection device 120 is permitted to collect data from a geographic region in which GNSS receiver 110 is currently located. In embodiments of the present invention, the key used to decrypt the geographic region identification is not shared with geospatial data collection device 120, or the vendor thereof. In one embodiment, second decryption key 632a is unique from decryption key 631a. In another embodiment, second decryption key 632a may comprise a portion of decryption key 631a. For example, if decryption key 631a comprises a 128-bit decryption key, second decryption key 632a may comprise the first 64 bits of decryption key 631a, the last 64 bits of decryption key 631a, etc. In another embodiment, decryption key 631a may be used to derive the geographic region identification descriptive of geospatial data collection device 120 instead of second decryption key 632a.

It is noted that a particular vendor identification may be associated with more than one product identification in embodiments of the present invention. For example, a vendor B may sell, or manufacture, a product B and a product C. Thus, in embodiments of the present invention, vendor B is associated with a vendor identification 611b, as well as product identification B (e.g., 621b) and product identification C (e.g., 621c). This prevents a particular vendor from using the same vendor identification to access GNSS receivers which they are not authorized to use, or sell.

Returning to FIG. 6, if authenticating component 310 receives vendor identification 611b and product identification 621b, decryption key 631b is used to authenticate geospatial data collection device 120 and second decryption key 632b is used to decrypt the geographic region identification. If authenticating component 310 receives vendor identification 611b and product identification 621c, decryption key 631c is used to authenticate geospatial data collection device 120 and second decryption key 632c is used to decrypt the geographic region identification.

Returning again to FIG. 5, upon determining the correct decryption key for authenticating geospatial data collection device 120, authenticating component 510 uses sequence generator 516 to generate a sequence which is used to authenticate geospatial data collection device 120. In embodiments of the present invention, sequence generator 516 generates a keyed-hash message authentication code (HMAC) which is generated using a hashing algorithm such as the Message-Digest algorithm 5 (MD5) which is implemented within a Hashed Message Authentication Code (HMAC) algorithm. However, embodiments of the present invention may utilize other hashing functions which include, but are not limited to, implementations of the HAVAL, PANAMA, RIPEMD, SHA, TIGER, VEST, and WHIRLPOOL hashing algorithms.

As an example, in one embodiment, sequence generator 516 uses as an input, the serial number of GNSS receiver 110 and the current time in order to generate the sequence which is sent to geospatial data collection device 120. Typically, geospatial data collection device 120 will also utilize its hashing algorithm and private key (e.g., 631a of FIG. 6) to generate a response to the sequence generated by sequence generator 516.

In the embodiment of FIG. 5, authenticating component 510 further comprises a response receiver 515 for receiving, from geospatial data collection device 120, a response to the sequence generated by sequence generator 516.

In the embodiment of FIG. 5, geospatial data collection device verifier 514 is used to verify the response to the message digest which is generated by geospatial data collection device 120. In embodiments of the present invention, geospatial data collection device verifier 514 again uses decryption key 631a in conjunction with the MD-5 hashing algorithm to verify the response sent by geospatial data collection device 120. In one embodiment of the present invention, if geospatial data collection device 120 sends a correct response to GNSS receiver 110, or to key server 140, authenticating component 510 generates a signal which causes control interface enabler 530 to allow geospatial data collection device 120 to access control interface 540. In another embodiment, if geospatial data collection device 120 sends a correct response to GNSS receiver 110, or to key server 140, authenticating component 510 generates a signal and/or data to geographic location verifier 520 to facilitate determining whether data collection device 120 is permitted to collect data from a geographic region in which GNSS receiver 110 is currently located. In another embodiment, authenticating component 510 determines the second decryption key (e.g., 632a) which is used by geographic location verifier 520 in determining whether geospatial data collection device 120 is permitted to collect data from a geographic region in which GNSS receiver 110 is currently located. In other words, authenticating the identity of geospatial data collection device 120 is not performed.

In the embodiment of FIG. 5, upon verifying the identity of geospatial data collection device 120, system 500 then determines geospatial data collection device 120 is permitted to collect data from a geographic region in which GNSS receiver 110 is currently located. If geospatial data collection device 120 is not authenticated, control interface 540 remains closed to geospatial data collection device 120.

In the embodiment of FIG. 5, vendor identification input 521 receives the vendor identification sent by geospatial data collection device 120 via authenticating component 510. Decryption key input 523 accesses the second decryption key (e.g., 632a of FIG. 6) from authenticating component 510. Geographic location verifier 520 then derives a geographic region identification (e.g., using geographic region identification deriver 522) to determine a geographic region in which geospatial data collection device 120 is authorized to collect data and/or configure devices. For example, in one embodiment, the vendor identification, user identification, or some other unique identification of geospatial data collection device 120 (e.g., 611*a*) comprises a 40-bit alpha-numeric sequence. In one embodiment, 8 bits of the 40-bit alpha-numeric sequence actually identify the user or vendor of GNSS receiver 110 and/or geospatial data collection device 120, while a 2-bit sequence within the vendor identification or user identification associated with geospatial data collection device 120 comprises an encrypted geographic region identification. In embodiments of the present invention, geographic region identification deriver 522 uses second decryption key 632*a* to derive the geographic region identification from the encrypted sequence within vendor identification 611*a*.

As described above, the geographic region identification geographic region in which geospatial data collection device 120 is authorized to collect data and/or configure devices. In one embodiment, the derived geographic region identification is input to geographic region comparator 524. Geographic position input 525 receives the current geographic position of GNSS receiver 110 from position determining component 225. This is also input to geographic region comparator 524. Geographic region comparator 524 then compares the derived geographic region identification with the current geographic position of GNSS receiver 110. If it is determined that the current geographic position of GNSS receiver 110 is within the geographic region described by the geographic region identification of geospatial data collection device 120, a signal is generated which causes control interface enabler 530 to allow geospatial data collection device 120 to access control interface 540.

In embodiments of the present invention, the vendor identification sent by geospatial data collection device 120 comprises a unique vendor identification, or another identification which uniquely identifies geospatial data collection device 120 or a user thereof, and an encrypted geographic region identification.

FIGS. 7A and 7B are a flowchart 700 used by a login protection and prevention system in accordance with an embodiment of the present invention. In step 705, a request for challenge data is received by GNSS receiver 110, or by key server 140. As described above with reference to FIG. 4, if geospatial data collection device 120 attempts to generate a command to GNSS receiver 110 without first logging in, GNSS receiver 110, or key server 140, will respond with a Nack message (e.g., 420 of FIG. 4). Geospatial data collection device 120 will then generate a request for challenge data (e.g., 430 of FIG. 4) in order to initiate logging in to the control interface of GNSS receiver 110, or to access therefrom. Alternatively, geospatial data collection device 120 may generate a check status message (e.g., 330 of FIG. 3) which will again result in the Nack message (e.g., 340 of FIG. 3).

In step 710, a vendor identification or another unique identification is received by GNSS receiver 110, or by key server 140. In embodiments of the present invention, geospatial data collection device 120 also conveys a vendor identification or another unique identification to GNSS receiver 110, or to key server 140. In one embodiment, this is sent along with the request for challenge data. In another embodiment, the request for challenge data may be sent in a separate, discreet message.

In step 715, a product identification is received by GNSS receiver 110, or key server 140. In one embodiment, the product identification is sent by geospatial data collection device 120 at the same time as the request for challenge data and/or the vendor identification. In another embodiment, the product identification may be sent in a separate, discreet message.

In step 720, a decryption key is identified using the vendor identification, or other identification, and the product identification. As described above, embodiments of the present invention use the product identification and the vendor identification, or another identification, to determine which private decryption key will be used to authenticate the identity of geospatial data collection device 120.

In step 725, challenge data is generated by GNSS receiver 110, or by key server 140. As described above, in embodiments of the present invention GNSS receiver 110 or key server 140 utilizes a hashing function implemented within an HMAC algorithm in conjunction with an input sequence and the decryption key identified in step 720 above to generate a challenge to geospatial data collection device 120.

In step 730, a message digest is received by GNSS receiver 110, or by key server 140. In embodiments of the present invention, geospatial data collection device 120 decrypts the challenge generated by GNSS receiver 110, or key server 140, in step 725 and generates an encrypted message digest in response which is received by GNSS receiver 110, or by key server 140.

In step 735, a second decryption key is identified using the vendor identification, or another unique identification, and the product identification. As described above with reference to FIG. 6, in one embodiment a second decryption key is used to decrypt a geographic region identification which is associated with geospatial data collection device 120.

In step 740, the message digest is decrypted using the decryption key identified in step 730. As described above, GNSS receiver 110, or by key server 140, decrypts the message digest sent by geospatial data collection device 120.

In step 745, a logical operation is performed to determine whether the received message digest is the correct response to the challenge data generated in step 720. GNSS receiver 110, or key server 140, then determines whether the response to the challenge data (e.g., message digest 450 of FIG. 4) is the correct response to the challenge data generated in step 725.

In step 750 login to the control interface of GNSS receiver 110 is prevented. If GNSS receiver 110, or key server 140, determines that geospatial data collection device 120 has sent an incorrect response to its challenge data, GNSS receiver 110, or key server 140 will prevent login to the control interface (e.g., 540 of FIG. 5) of GNSS receiver 110. In the embodiment of FIGS. 7A and 7B, method 700 then proceeds to step 755. However it is noted that in another embodiment of the present invention, method 700 may proceed directly to step 780 if it is determined that geospatial data collection device 120 has provided the correct response to the challenge data.

In step 755, the vendor identification, or another identification is decrypted using the second decryption key identified in step 735. As described above, in embodiments of the present invention geographic location verifier 520 may use a second decryption key (e.g., 632*a* of FIG. 6) to derive a geographic identification from an encrypted portion of a vendor identification (e.g., 611*a* of FIG. 6). Alternatively, geographic location verifier 520 may use a second decryption key (e.g., 632*a* of FIG. 6) to derive a geographic identification from an encrypted portion of a user identification sent by geospatial data collection device 120. In another embodiment, the unique identification may be associated with geospatial data collection device 120 itself.

In step 760, a geographic identification is determined. In embodiments of the present invention, the decrypted geographic identification describes a region in which geospatial data collection device 120 is allowed to configure and/or retrieve data from GNSS receivers located therein.

In step 765, the current geographic position of GNSS receiver 110 is determined. In embodiments of the present invention, the current geographic position of GNSS receiver 110 is then determined using position determining component 225. In one embodiment, this is used by GNSS receiver 110 itself. In another embodiment, the current geographic position of GNSS receiver 110 is accessed by key server 140.

In step 770, a logical operation is performed to determine whether the geographic identification from step 760 matches the current geographic position of GNSS receiver 110. As described above, in one embodiment geographic region comparator 524 determines whether the current geographic position of GNSS receiver 110 is within the geographic region identified in step 760 above.

In step 775, login to the control interface of GNSS receiver 110 is prevented. In one embodiment, if the current geographic position of GNSS receiver 110 is not within the geographic region identified in step 760, login to the control interface (e.g., 540 of FIG. 5) is prevented.

In step 780, access to the control interface of GNSS receiver 110 is allowed. In the embodiment of FIGS. 7A and 7B, it has been determined that GNSS receiver 110 is within the geographic region in which geospatial data collection device 120 is allowed to configure and/or retrieve data from GNSS receivers located therein. Furthermore, the identity of geospatial data collection device 120 has also been authenticated. As a result, GNSS receiver 110 allows geospatial data collection device 120 to access its control interface (e.g., 540 of FIG. 5). In another embodiment, key server 140 facilitates the accessing of GNSS receiver 110 by geospatial data collection device 120.

In step 785, a logical operation is performed to determine whether a timeout period has expired. In one embodiment, periodic re-authentication of geospatial data collection device 120 may be required by GNSS receiver 110, or by key server 140. If a timeout interval has not yet elapsed, or if a timeout period is not defined, method 700 returns to step 780. If the timeout period has elapsed, method 700 returns to step 725 and new challenge data is generated by GNSS receiver 110, or by key server 140.

FIG. 8 is a flowchart of a method 800 for implementing login protection to a Global Navigation Satellite System (GNSS) receiver in accordance with an embodiment of the present invention. In step 810 of FIG. 8, a geospatial data collection device which is configured to be communicatively coupled with a GNSS receiver is authenticated. As described above, In step 820 of FIG. 8, it is determined that the geospatial data collection device is authorized to collect data from a geographic region in which the GNSS receiver is located.

In step 830 of FIG. 8, the geospatial data collection device is permitted to access a control interface of the GNSS receiver.

FIG. 9 is a flowchart of another method 900 for implementing login protection to a Global Navigation Satellite System (GNSS) receiver in accordance with an embodiment of the present invention. In step 910 of FIG. 9, a decryption key which is uniquely associated with at least one geospatial data collection device is accessed.

In step 920 of FIG. 9, the geospatial data collection device is verified using the decryption key.

In step 930 of FIG. 9, the geospatial data collection device is permitted to access a control interface of the GNSS receiver.

Figure 10:
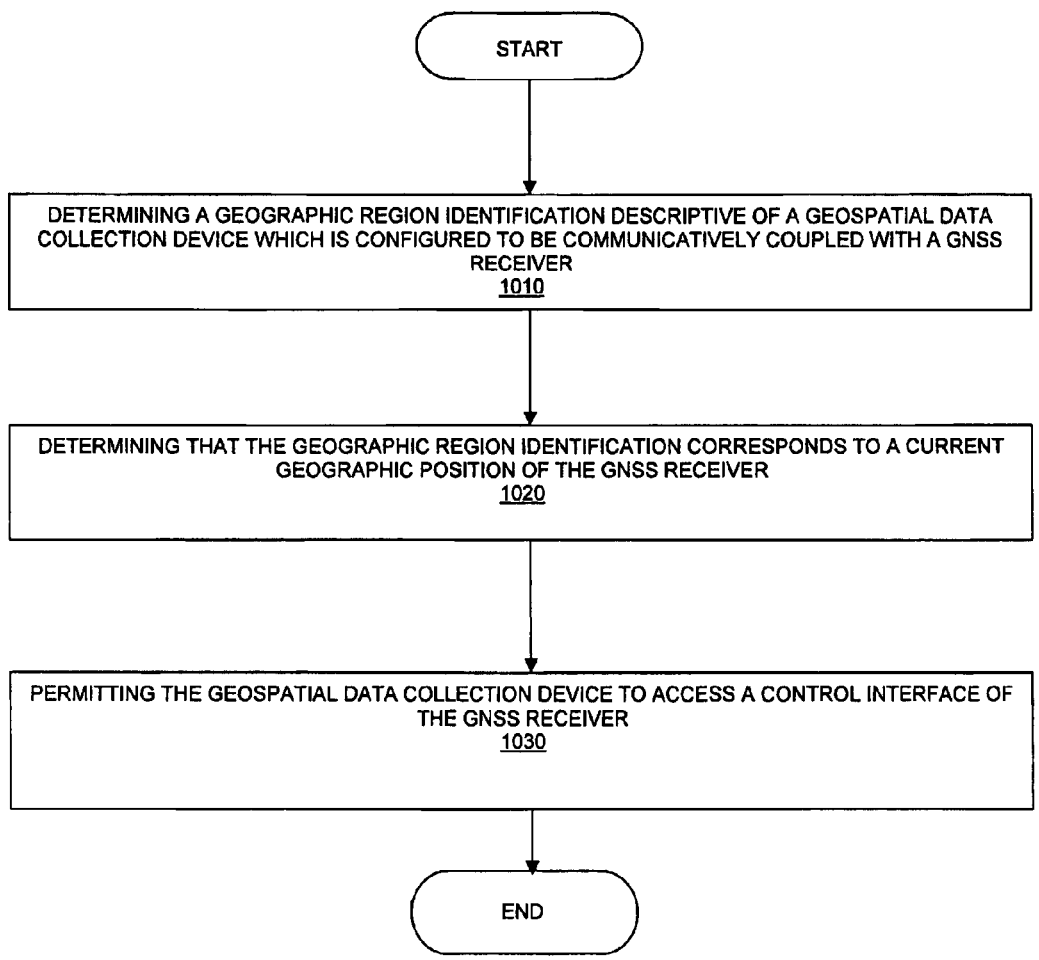
FIG. 10 is a flowchart of another method for implementing login protection to a Global Navigation Satellite System (GNSS) receiver in accordance with an embodiment of the present invention.

FIG. 10 is a flowchart of another method 1000 for implementing login protection to a Global Navigation Satellite System (GNSS) receiver in accordance with an embodiment of the present invention. In step 1010 of FIG. 10, a geographic region identification descriptive of a geospatial data collection device is determined.

In step 1020 of FIG. 10, it is determined that the geographic region identification corresponds to a current geographic position of a GNSS receiver.

In step 1030 of FIG. 10, the geospatial data collection device is permitted to access a control interface of the GNSS receiver.

Figure 11:
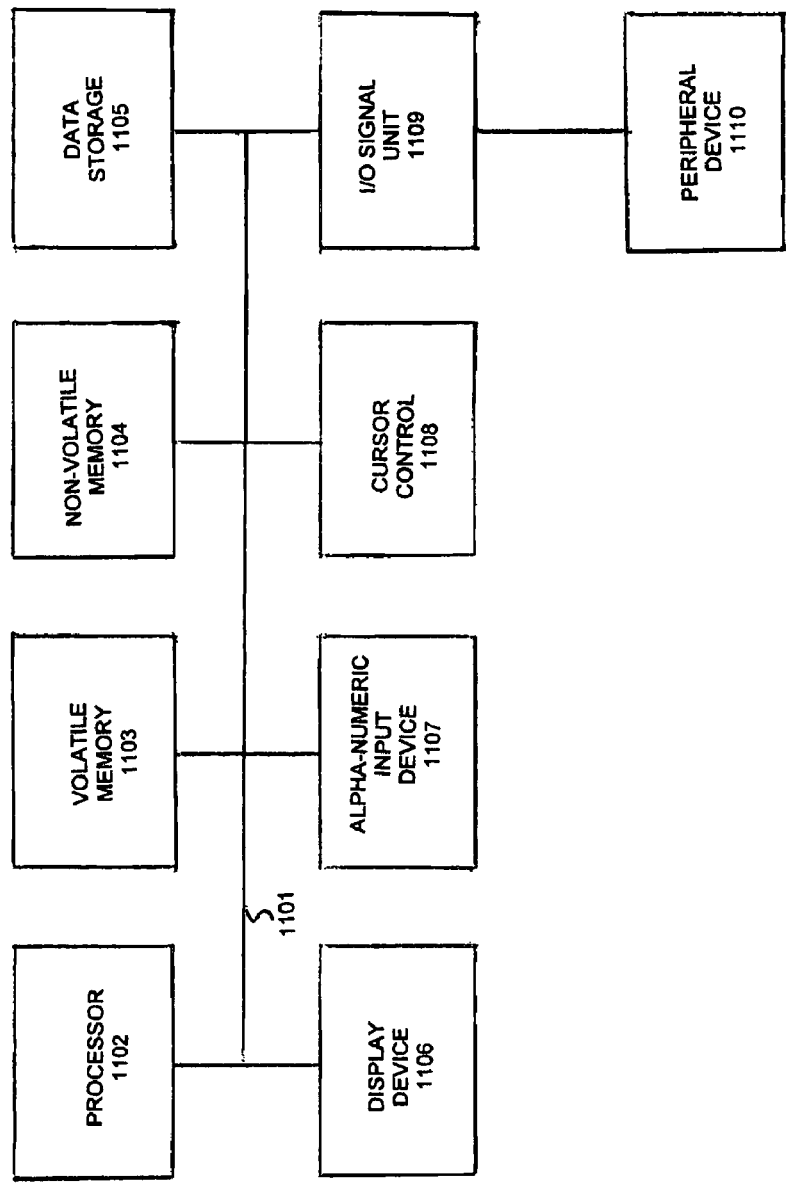
FIG. 11 shows an exemplary computer system upon which embodiments of the present invention may be implemented.

FIG. 11 shows an exemplary electronic device (e.g., key server 140) in accordance with embodiments of the present invention. In FIG. 11 computer system 1100 includes an address/data bus 1101 for conveying digital information between the various components, a central processor unit (CPU) 1102 for processing the digital information and instructions, a volatile main memory 1103 comprised of volatile random access memory (RAM) for storing the digital information and instructions, and a non-volatile read only memory (ROM) 1104 for storing information and instructions of a more permanent nature. In addition, computer system 1100 may also include a data storage device 1105 (e.g., a magnetic, optical, floppy, or tape drive or the like) for storing vast amounts of data. It should be noted that the software program for performing GNSS receiver login protection and prevention of the present invention can be stored either in volatile memory 1103, data storage device 1105, or in an external storage device (not shown).

Devices which are optionally coupled to computer system 1100 include a display device 1106 for displaying information to a computer user, an alpha-numeric input device 1107 (e.g., a keyboard), and a cursor control device 1108 (e.g., mouse, trackball, light pen, etc.) for inputting data, selections, updates, etc. Computer system 1100 can also include a mechanism for emitting an audible signal (not shown).

Returning still to FIG. 11, optional display device 1106 of FIG. 11 may be a liquid crystal device, cathode ray tube, or other display device suitable for creating graphic images and alpha-numeric characters recognizable to a user. Optional cursor control device 1108 allows the computer user to dynamically signal the two dimensional movement of a visible symbol (cursor) on a display screen of display device 1106. Many implementations of cursor control device 1108 are known in the art including a trackball, mouse, touch pad, joystick, or special keys on alpha-numeric input 1107 capable of signaling movement of a given direction or manner displacement. Alternatively, it will be appreciated that a cursor can be directed and/or activated via input from alpha-numeric input 1107 using special keys and key sequence commands. Alternatively, the cursor may be directed and/or activated via input from a number of specially adapted cursor directing devices.

Furthermore, computer system 1100 can include an input/output (I/O) signal unit (e.g., interface) 1109 for interfacing with a peripheral device 1110 (e.g., a computer network, modem, mass storage device, etc.). Accordingly, computer system 1100 may be coupled in a network, such as a client/server environment, whereby a number of clients (e.g., personal computers, workstations, portable computers, mini-computers, terminals, etc.) are used to run processes for performing desired tasks. In particular, computer system 1100 can be coupled in a system for GNSS receiver login protection and prevention.

Embodiments of the present invention, a method and system for GNSS receiver login protection and prevention, are thus described. While the present invention has been described in particular embodiments, it should be appreciated that the present invention should not be construed as limited by such embodiments, but rather construed according to the following claims.

What is claimed is:

1. A method for implementing login protection to a Global Navigation Satellite System (GNSS) receiver, said method comprising:
   accessing a decryption key which is uniquely associated with at least one geospatial data collection device configured to be communicatively coupled with a second device comprising said GNSS receiver;
   verifying said geospatial data collection device using said decryption key;
   permitting said geospatial data collection device to access a control interface of said GNSS receiver;
   receiving an identification which is assigned to said geospatial data collection device and a product identification which is assigned to said GNSS receiver; and
   using said identification and said product identification to identify said decryption key and a second decryption key; and
   using said second decryption key to derive a geographic region identification from said identification.

2. The method as recited in claim 1 further comprising:
   conveying a randomly generated sequence to said geospatial data collection device;
   receiving a response to said randomly generated sequence from said geospatial data collection device; and
   verifying said response using said decryption key.

3. The method as recited in claim 1 further comprising:
   using said GNSS receiver to determine a current geographic position of said GNSS receiver;
   comparing said geographic region identification with said current geographic position; and
   determining that said geographic region identification corresponds to said current geographic position.

4. The method as recited in claim 1 further comprising:
   using an electronic device communicatively coupled with said geospatial data collection device and with said GNSS receiver to perform said accessing, said verifying, and said permitting.

5. A method for implementing login protection to a Global Navigation Satellite System (GNSS) receiver, said method comprising:
   determining a geographic region identification descriptive of a geospatial data collection device configured to be communicatively coupled with a second device comprising said GNSS receiver;
   verifying that said geographic region identification corresponds to a current geographic position of said GNSS receiver; permitting said geospatial data collection device to access a control interface of said GNSS receiver; and
   receiving an identification which is assigned to said geospatial data collection device and a product identification which is assigned to said GNSS receiver;
   using said identification and said product identification to identify a decryption key and a second decryption key; and
   using said second decryption key to derive a geographic region identification from said identification.

6. The method as recited in claim 5 further comprising:
   conveying a randomly generated sequence to said geospatial data collection device in response to said receiving;
   receiving a response to said randomly generated sequence from said geospatial data collection device; and
   verifying said response using said decryption key.

7. The method as recited in claim 6 wherein said verifying further comprises:
   using said GNSS receiver to determine said current geographic position; and
   comparing said geographic region identification with said current geographic position.

8. The method as recited in claim 5 further comprising:
   using an electronic device communicatively coupled with said geospatial data collection device and with said GNSS receiver to perform said determining, said verifying, and said permitting.

9. A system for implementing login protection to a Global Navigation Satellite System (GNSS) receiver, said system comprising:
   an authenticating component coupled with a communication interface for authenticating a geospatial data collection device which is configured to be communicatively coupled with a second device comprising said GNSS receiver, said authenticating component comprising:
     an identification receiver for receiving an identification from said geospatial data collection device and wherein said identification is assigned to said geospatial data collection device;
     a product identification receiver for receiving a product identification from said geospatial data collection device and wherein said product identification is assigned to said GNSS receiver; and
     a decryption key identifier coupled with said identification receiver and with said product identification receiver, said decryption key identifier for identifying a decryption key based upon said identification and said product identification;
   a geographic location verifier coupled with said authenticating component, said geographic location verifier for determining that said geospatial data collection device is authorized to collect data from a geographic region in which said GNSS receiver is located; and
   a control interface enabler coupled with said authenticating component and with said geographic location verifier, said control interface enabler for permitting said geospatial data collection device to access a control interface of said GNSS receiver; and
   a geographic region identification deriver for deriving said geographic region from said identification using a second decryption key which is identified by said decryption key identifier.

10. The system of claim 9 wherein said authenticating component further comprises:
    a sequence generator for generating a random sequence which is conveyed to said geospatial data collection device;
    a response receiver for receiving a response to said random sequence from said geospatial data collection device; and
    a geospatial data collection device verifier coupled with said response receiver and with said decryption key identifier, said geospatial data collection device verifier for verifying said response using said decryption key.

11. The system of claim 10 wherein said geographic location verifier further comprises:

a geographic position input for receiving a current geographic position of said GNSS receiver; and a geographic region comparator for comparing said geographic region identification with said current geographic position and for determining that said geographic region identification corresponds to said current geographic position.

12. The method as recited in claim 11 wherein said geographic region identification deriver further comprises:

an identification input coupled with said identification receiver and with said geographic region identification deriver; and a decryption key input coupled with said decryption key identifier and with said geographic region identification deriver.

* * * * *